United States Patent
Yang et al.

(10) Patent No.: US 12,423,861 B2
(45) Date of Patent: Sep. 23, 2025

(54) METRIC LIFTING OF 3D HUMAN POSE USING SOUND

(71) Applicant: SAMSUNG ELECTRONICS CO., LTD., Suwon-si (KR)

(72) Inventors: Zhijian Yang, Urbana, IL (US); Xiaoran Fan, Irvine, CA (US); Ibrahim Volkan Isler, Saint Paul, MN (US); Hyun Soo Park, New York, NY (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 401 days.

(21) Appl. No.: 17/987,460

(22) Filed: Nov. 15, 2022

(65) Prior Publication Data
US 2023/0154041 A1   May 18, 2023

Related U.S. Application Data

(60) Provisional application No. 63/279,952, filed on Nov. 16, 2021.

(51) Int. Cl.
*G06T 7/73* (2017.01)
*G06T 7/50* (2017.01)
*H04R 1/40* (2006.01)

(52) U.S. Cl.
CPC ............ *G06T 7/73* (2017.01); *G06T 7/50* (2017.01); *H04R 1/406* (2013.01); *G06T 2207/20081* (2013.01); *G06T 2207/20084* (2013.01)

(58) Field of Classification Search
CPC ... G06T 7/73; G06T 7/50; G06T 2207/20081; G06T 2207/20084; G06T 2207/30196; G06T 7/70; H04R 1/40; H04R 1/406
See application file for complete search history.

(56) References Cited

U.S. PATENT DOCUMENTS

| | | | |
|---|---|---|---|
| 10,354,169 B1 * | 7/2019 | Law | G06F 18/214 |
| 10,559,111 B2 * | 2/2020 | Sachs | G06F 18/23 |
| 10,847,162 B2 * | 11/2020 | Krupka | G06V 10/764 |
| 10,880,667 B1 * | 12/2020 | Cho | G06V 10/7715 |
| 10,949,715 B1 * | 3/2021 | Berlin | G06T 17/00 |
| 11,112,389 B1 * | 9/2021 | Robinson | G01H 7/00 |
| 11,265,668 B1 * | 3/2022 | Patil | H04S 7/305 |
| 11,514,634 B2 * | 11/2022 | Liao | G06N 3/044 |
| 11,762,052 B1 * | 9/2023 | Ganguly | G01S 5/20 367/124 |

(Continued)

OTHER PUBLICATIONS

Efremova et al. "Data-efficient classification of birdcall through convolutional neural networks transfer learning." 2019 Digital image computing: Techniques and applications (DICTA). IEEE, 2019. (Year: 2019).*

(Continued)

*Primary Examiner* — Stephen R Koziol
*Assistant Examiner* — Benedict E Lee
(74) *Attorney, Agent, or Firm* — Sughrue Mion, PLLC

(57) ABSTRACT

A pose of a person is estimated using an image and audio impulse responses. The image represents a 2D scene including the person. The audio impulse responses are obtained with the present absent and present in an environment. The pose is reconstructed based on the image and the one or more audio impulse responses. The pose is a metric scale human pose.

19 Claims, 13 Drawing Sheets

(56) References Cited

U.S. PATENT DOCUMENTS

| | | | | |
|---|---|---|---|---|
| 11,790,535 B2* | 10/2023 | Gronau | ............... | G06T 7/194 |
| | | | | 382/173 |
| 11,997,456 B2* | 5/2024 | Stein | ............... | H04R 3/005 |
| 12,112,521 B2* | 10/2024 | Walsh | ............... | G06V 20/64 |
| 2013/0208900 A1* | 8/2013 | Vincent | ............... | H04R 5/04 |
| | | | | 381/17 |
| 2018/0366139 A1* | 12/2018 | Bowden | ............... | G10L 25/30 |
| 2020/0304707 A1* | 9/2020 | Williams | ............... | G06N 3/088 |
| 2023/0103112 A1* | 3/2023 | Nadler | ............... | G06N 3/084 |
| | | | | 382/156 |

OTHER PUBLICATIONS

McDonagh et al. "Synthesizing game audio using deep neural networks." 2018 IEEE Games, Entertainment, Media Conference (GEM). IEEE, 2018. (Year: 2018).*

* cited by examiner

METRIC LIFTING OF 3D HUMAN POSE USING SOUND

CROSS REFERENCE TO RELATED APPLICATIONS

This application claims benefit of priority to U.S. Provisional Patent Application 63/279,952 filed Nov. 16, 2021, the content of which is incorporated by reference herein.

FIELD

The present disclosure is related to processing an image and audio to obtain a metric pose.

BACKGROUND

Recovering a representation of a person in three dimensions from a flat two dimensional image leads to more than one solution because a height of the person is not known. Stated generally, reconstructing the 3D pose of a person in metric scale is an ill-posed problem. For example, a camera does not indicate the distance to a person without additional scene assumptions such as assuming or obtaining the height of the person separately from the image.

Robotics and augmented reality need precise metric measurements of human activities in relation to surrounding physical objects.

For example, smart home technology may monitor fragile populations such as children, patients and the elderly. Using multiple cameras can support metric reconstruction, but the number of required cameras increases quadratically as the area of an observed environment increases.

SUMMARY

Provided herein is a method of estimating a pose of a subject human, the method including obtaining a data image of the subject human in a target environment; obtaining a plurality of data audio recordings of the target environment while the subject human is present in the target environment; determining, by a neural network (NN), a 3D metric pose of the subject human based on an input of the data image and the plurality of data audio recordings, wherein the NN is trained using a training dataset including training images and training audio recordings captured in a plurality of training environments with respect to a plurality of training humans.

Also provided herein is a system for estimating a pose of a subject human, the system including a plurality of audio sensors configured to provide a first plurality of audio recordings in a plurality of training environments with no human present and a second plurality of audio recordings in the plurality of training environments when a training human is present; a camera configured to provide a data image of the subject human in a subject environment, wherein the data image does not include depth information; a second plurality of audio sensors configured to: obtain the second plurality of audio recordings in the subject environment when no human is present, and obtain a third plurality of audio recordings in the subject environment when the subject human is present; a first processor configured to: lift a plurality of training pose kernels from the first plurality of audio recordings and the second plurality of audio recordings, and train a neural network (NN) based on the plurality of training pose kernels and depth information of the training human in the plurality of training environments; and a second processor configured to: implement the NN to lift a 3D metric pose of the subject human based on the data image, the second plurality of audio recordings and the third plurality of audio recordings.

Also provided herein is a non-transitory computer readable medium for storing a program to be implemented by a processor to estimate a pose of a subject human by: obtaining a data image of the subject human in a target environment; obtaining a plurality of data audio recordings of the target environment while the subject human is present in the target environment; and determining, using a neural network (NN) trained based on a plurality of training humans in a plurality of training environments and based on the data image and the plurality of data audio recordings, a 3D metric pose of the subject human.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

Figure 1:
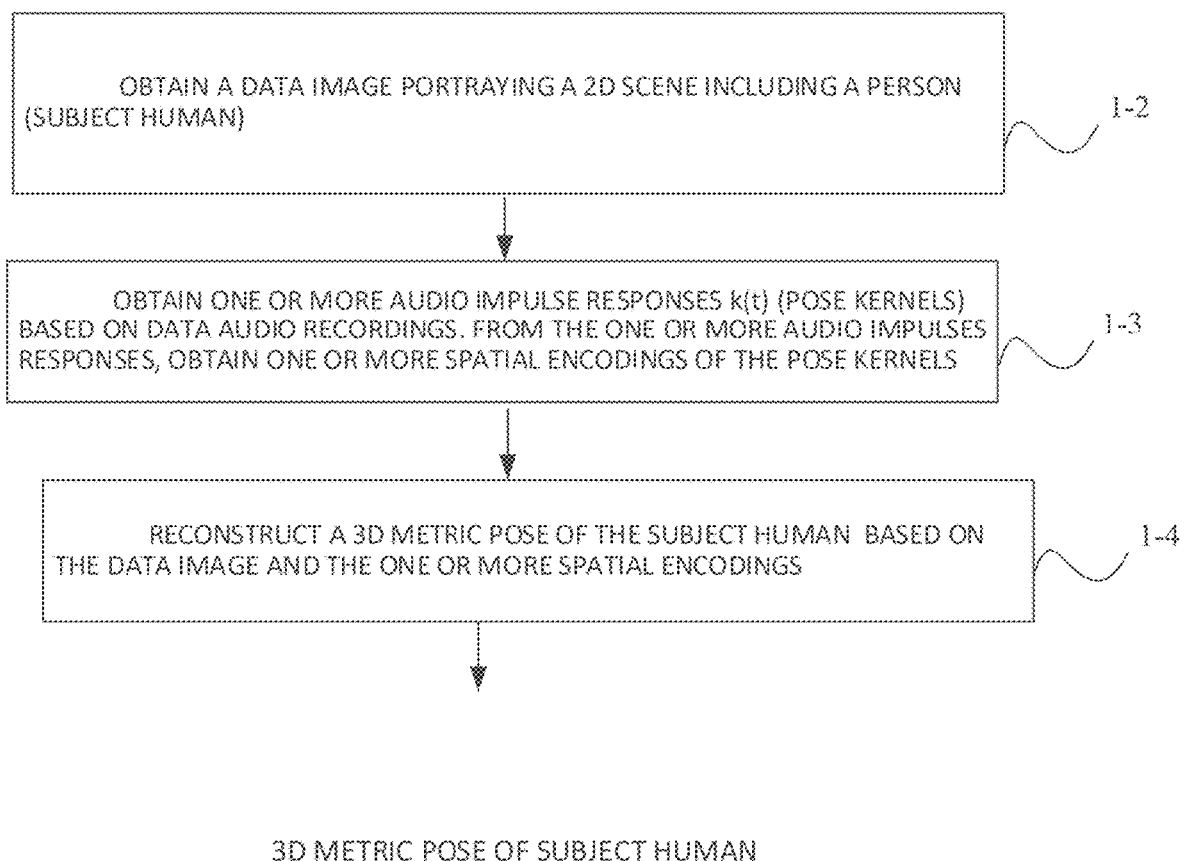
FIG. 1 illustrates logic for obtaining a 3D metric pose, according to some embodiments.

FIG. 1 illustrates exemplary logic 1-1 for reconstructing a 3D metric pose of a subject human. At operation 1-2, a data image portraying a 2D scene including a person, the subject human, is obtained. At operation 1-3, one or more audio impulse responses are obtained based on data audio recordings. One or more pose kernels are obtained from the data audio recordings. At operation 1-4, the 3D metric pose of the subject human is obtained by a neural network based on the data image and the one or more pose kernels.

Figure 2:
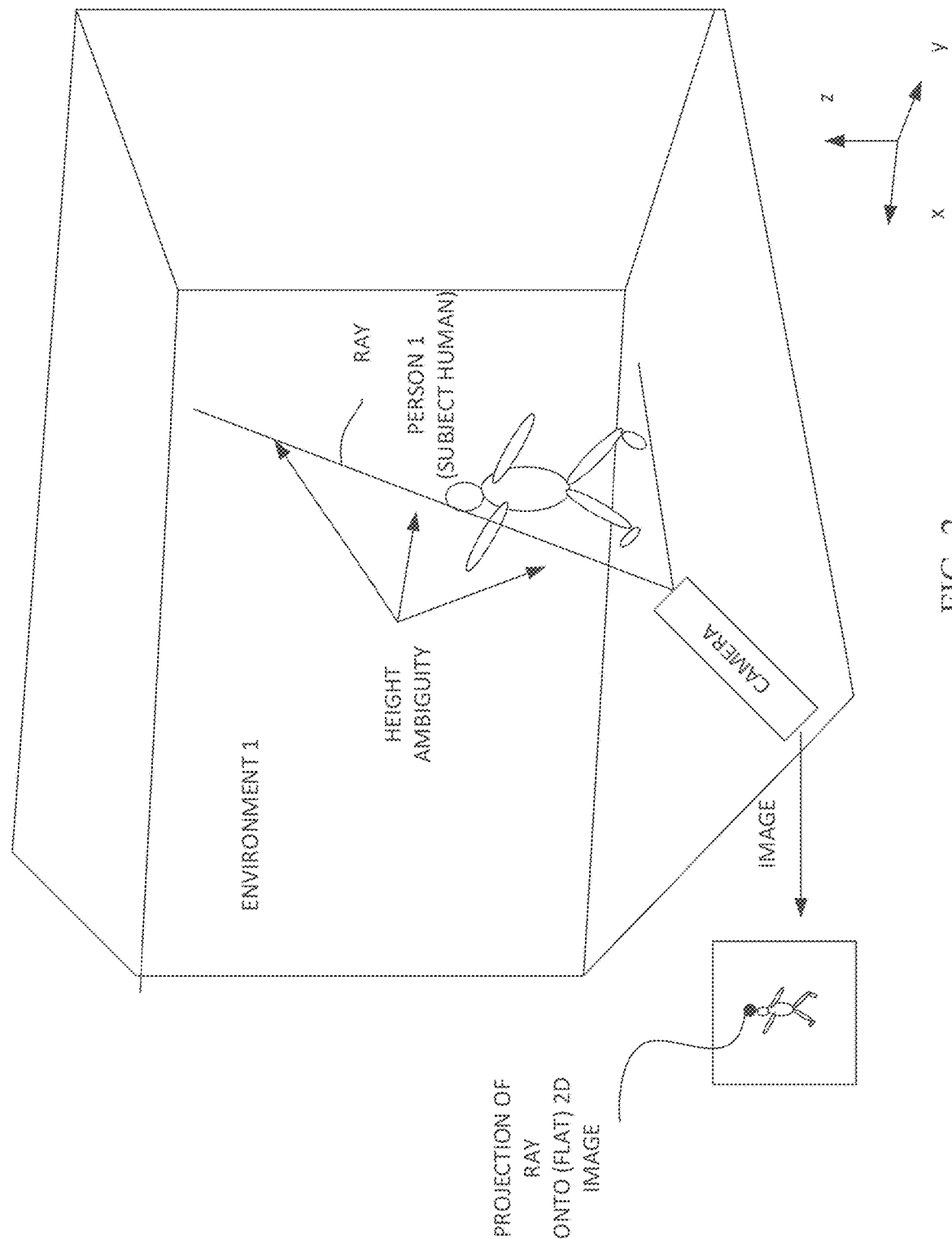
FIG. 2 illustrates a height ambiguity problem present when a camera projects rays from a 3D subject onto an image plane.

FIG. 2 illustrates a problem of height ambiguity when considering a 2D image. A camera takes a picture of a scene including person 1 (the subject human) in an environment 1. Orthogonal coordinate axes x, y and z are shown for this stylized perspective drawing.

A ray is shown entering the camera and being projected onto a (flat) 2D image. All of the points along the ray are projected into a single point on the image. There is a height ambiguity of the subject human, because the distance to the subject human is not known from the image, and the person may be a short person near the camera or a corresponding taller person further from the camera. This simple example illustrates the lack of 3D information in a single image. Correspondingly, for example, a smart home monitor processing the single image does not precisely where the subject human is, and so the smart home monitor cannot infer precisely whether the subject human is in a safe situation or in an at-risk situation.

Figure 3:
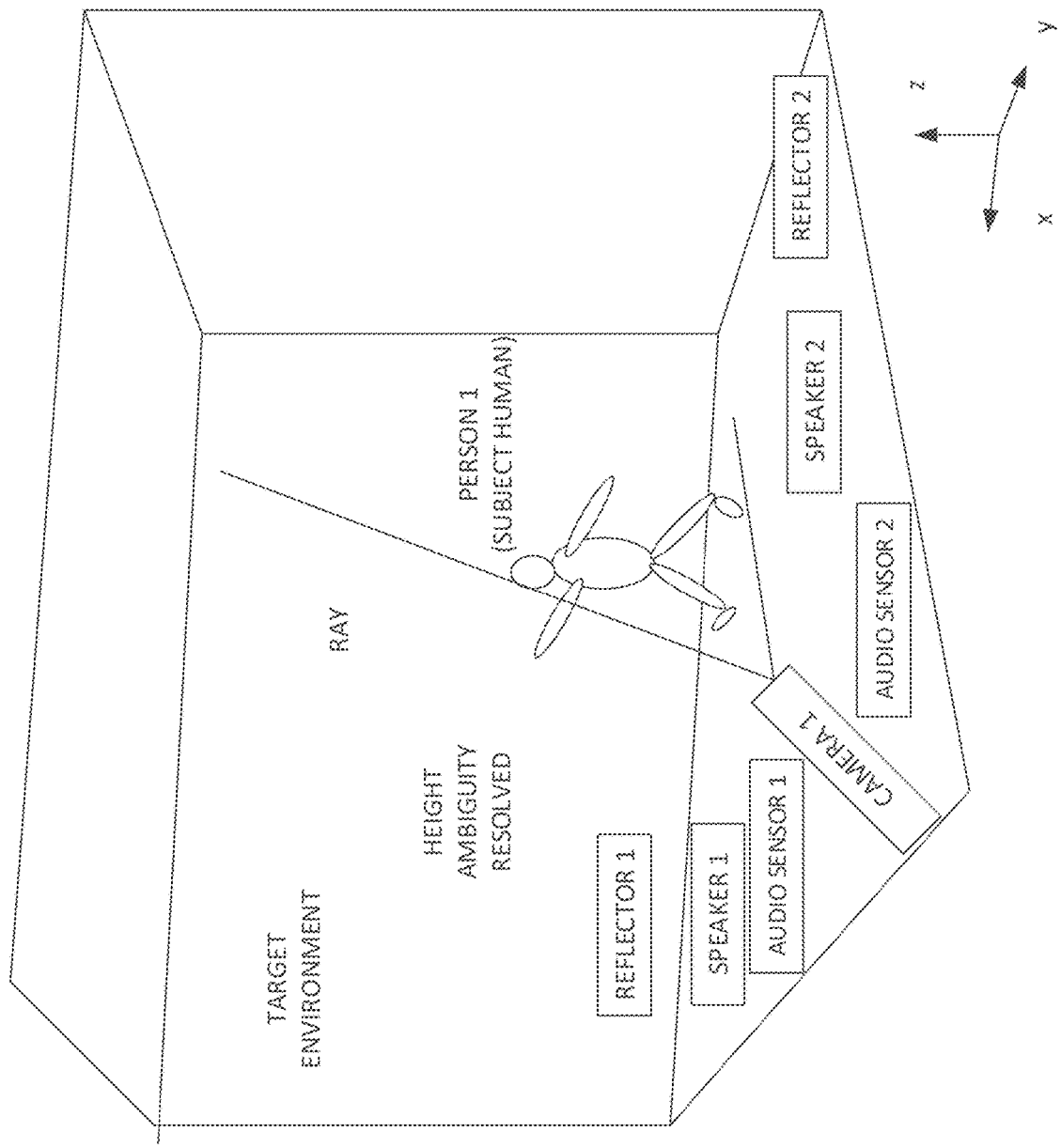
FIG. 3 illustrates resolution of the height ambiguity using audio recordings to complement the image from the camera, according to some embodiments.

FIG. 3 illustrates the subject human in a target environment including system components for obtaining the information needed to resolve the ambiguity described above with respect to FIG. 2. These system components, in addition to the camera 1, are a speaker 1, a speaker 2, an audio sensor 1 (a microphone), and an audio sensor 2 (another microphone). Based on a data image obtained by the camera 1 and audio recordings from the audio sensors, the height ambiguity is resolved and a 3D metric pose of the subject human is obtained. Techniques and logic for obtaining the 3D metric pose are provided below.

The target environment may incidentally also include audio reflectors, denoted as reflector 1 and reflector 2 in FIG. 3. The audio reflectors are part of the environment and are accounted for as part of the target environment when the subject human is not present. The target environment when the subject human is not present may be referred to as an empty environment or as an empty room, such as a room in house or office.

Sound is a wave which propagates with a known speed and reflects off of objects. Observation of a sound wave over time thus provides location information of an object. An example of this principle is sonar whereby a presence of an object underwater is detected using a reflected sound wave.

Figure 4:
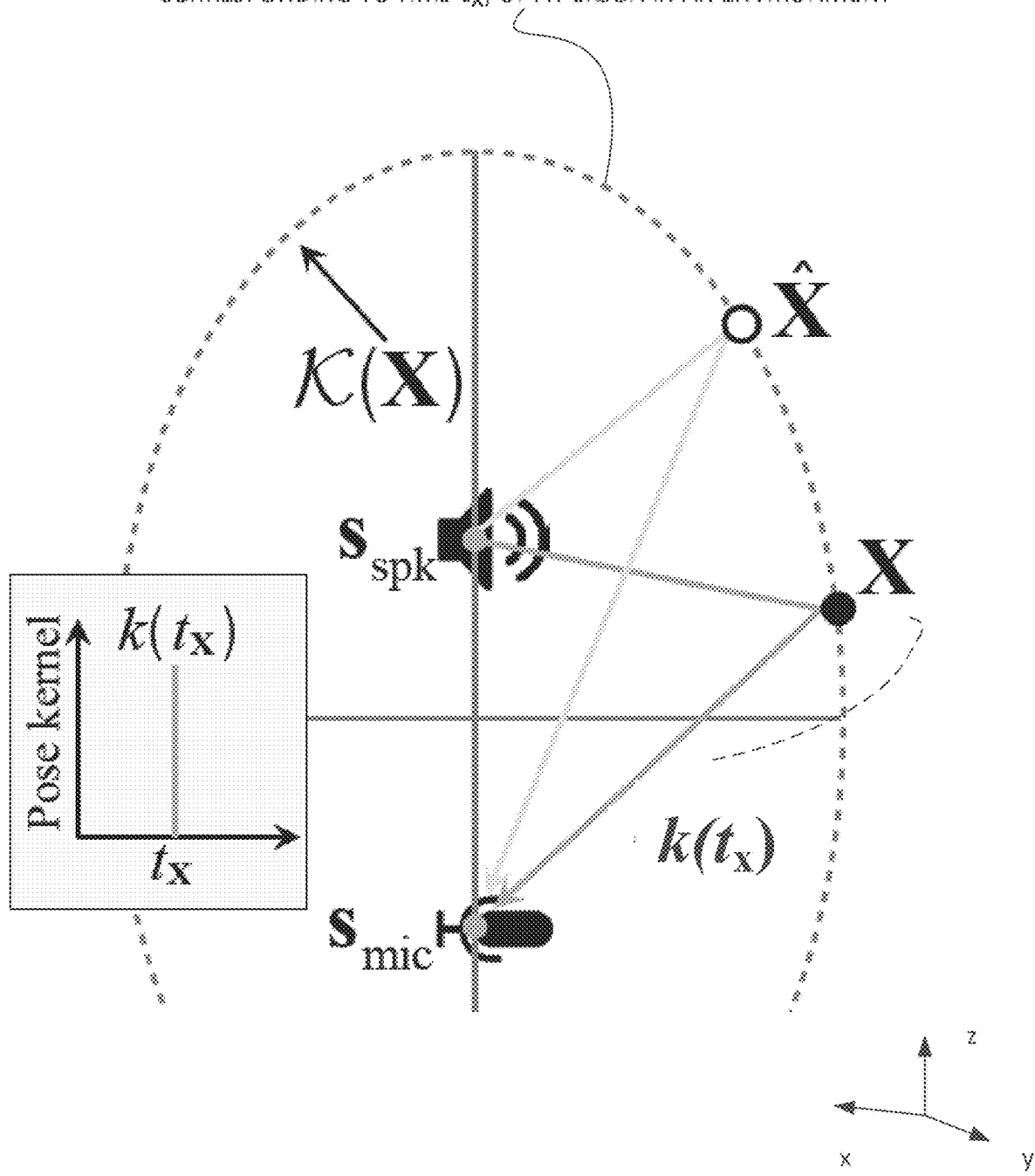
FIG. 4 illustrates a locus in 3D space of a landmark based on an audio recording at a microphone of a speaker signal reflected on a body surface of a person, according to some embodiments.

FIG. 4 illustrates a speaker at a location $s_{spk}$ and an audio sensor at a location $s_{mic}$. The speaker emits a known sound waveform which may be in the audible range or may be above the audible range (ultrasound, for example a chirp waveform).

The observed waveform is processed by deconvolution to obtain the impulse response of the person. To perform the deconvolution, the impulse response of the environment with no person present (empty room) is found.

Conceptually, for an impulse emitted at time 0 and observed at the audio sensor at time $t_x$ with amplitude $k(t_x)$, the points in space where a landmark on a body surface of the target human may be is an ellipse in two dimensions and an ellipsoid in three dimensions. The impulse response $k(t_x)$ is processed to obtain the spatial encoding $K(X)$ of the impulse response $k(t_x)$.

Any point in the locus indicated in FIG. 4 will solve the speed equation for the sound waveform leaving the speaker and arriving at the audio sensor. The locus is referred to as the spatial encoding of the pose kernel $K(X)$. In two dimensions, the locus is an ellipse. In three dimensions, the locus is an ellipsoid. If the speaker and audio sensor are co-located, the major and minor axes of the ellipse are of equal length (a circle) and the locus is a sphere in three dimensions.

Formally, the dashed surface in FIG. 4 is a locus of possible x, y, z locations of a landmark of a person in an environment. FIG. 4 indicates a point X on the body surface X of the person. In FIG. 4, both X and $\hat{X}$ are possible locations of the landmark. A single audio recording by itself does not provide more information. That is, it is not possible to determine a pin point location for a landmark on a body surface with a single audio recording and nothing else.

Each delay value of the pose kernel represents a possible reflector (landmark or joint) of the subject human. The spatial encoding represents a locus of points at which the landmark may be in three dimensional space.

Figure 5:
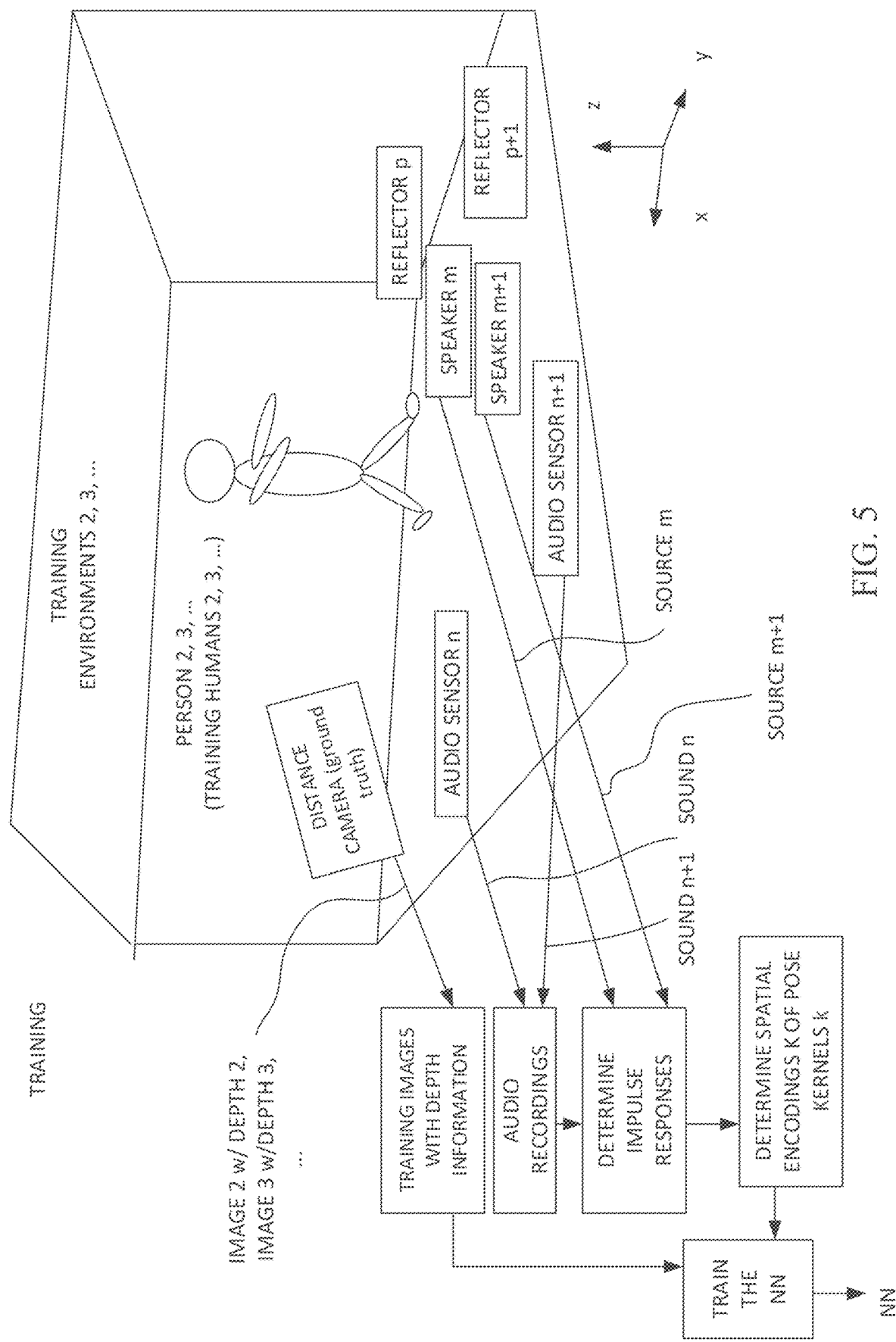
FIG. 5 illustrates information obtained to train a neural network to be used for pose lifting, according to some embodiments.

The pose lifting of embodiments uses a neural network (NN) to process an image and audio recordings and recover a 3D metric pose of a subject human. FIG. 5 illustrates training the NN for pose lifting.

Several training environments are used. No specific requirements are imposed on the training environments. In FIG. 5, the training environments are indicated as training environments 2, 3, . . . .

For each training environment, different people participate as training humans. For each collection of data, one training human is present in a given training environment. FIG. 5 schematically indicates reflector p and reflector p+1 in a training environment. The reflectors are such things as furniture and so present in a room in a home or office. Also audio sensor n and audio sensor n+1 are indicated. Only one audio sensor is needed. Increasing the number of audio sensors makes the trained NN more accurate. Speaker m and speaker m+1 are indicated in FIG. 5. In some embodiments, four audio sensors are used and four speakers. In a non-limiting example embodiment, one audio sensor is collocated with one speaker. Speaker m is driven with a waveform indicated as source m and speaker m+1 is driven with a waveform indicated as source m+1. Audio sensor n observes a sound indicated as sound n and audio sensor n+1 observes a sound indicated as sound n+1. The x, y, z coordinates of the speakers and audio sensors are known in the training environment (also the x, y, z coordinates of speakers and audio sensors are known in the target environment of FIG. 6).

FIG. 5 schematically illustrates the sensed information which is processed to train the NN. The distance camera provides image 2 with depth 2, image 3 with depth 3, and so on. In some embodiments, two distance cameras are used (not shown). The audio sensors provide audio recordings which correspond to each image. Impulses responses are determined from the speakers to the audio sensors. These impulse responses include position information of the training human, as described above with respect to FIG. 4. This information is determined as pose kernels K and provided for training the NN. The NN is trained based on the images with depth and the pose kernels. The training of the NN will be described in more detail with respect to FIGS. 10A and 10B.

In an example, the functionality of FIG. 5 may be realized with an ultrasound and vision fusion system including modules 1, 2, 3 and 4. The output of module 1 feeds module 2, the output of module 2 feeds module 3 and the output of module 3 feeds module 4.

Module 1 generates frequency division chirp signals from smart speakers.

Module 2 captures image data as well as reflected ultrasound signals from the environment.

Module 3 has inputs of captured ultrasound reflection and image data and output of ultrasound impulse response and 2D human joint locations in the data image.

Module 4 has inputs of the ultrasound impulse response and 2D human joint location and outputs the metric scale 3D human joint location.

Figure 6:
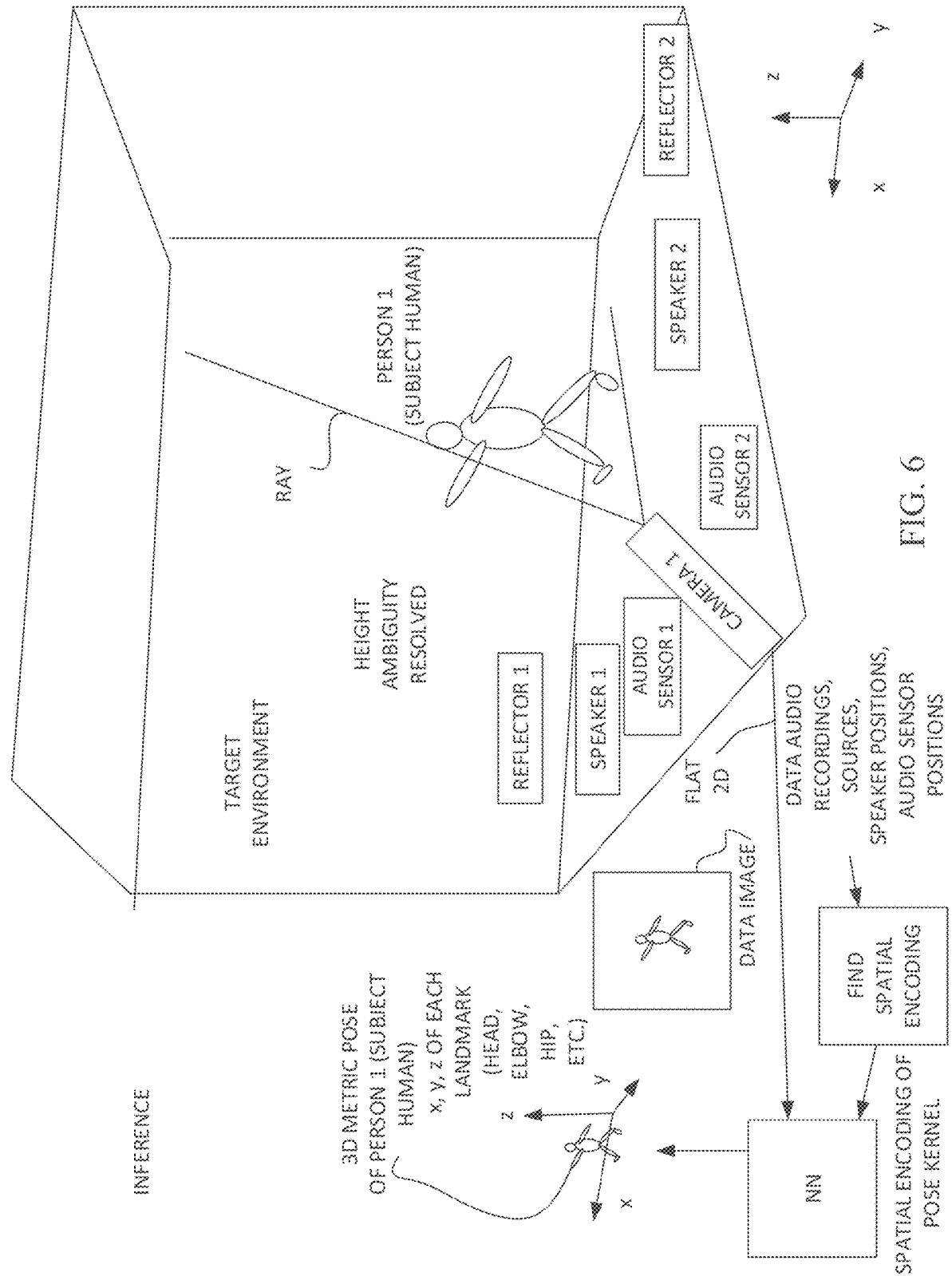
FIG. 6 illustrates obtaining a 3D metric pose of a subject human in a target environment using the neural network, according to some embodiments.

FIG. 6 illustrates an inference performed by the NN. FIG. 6 corresponds to FIG. 3. FIG. 6 illustrates the recovered pose provided by the NN.

Like FIG. 5, FIG. 6 includes a camera (camera 1). Camera 1 is not a distance camera and does not provide depth information. The output of camera 1 is a flat 2D image with no depth information. This image of the subject human may be referred to as a data image.

In FIG. 6, the audio recordings (e.g., sound n and sound n+1 similar to FIG. 5), the source waveforms (eg. source m and source m+1 similar to FIG. 5), the x, y, z coordinates of each speaker and the x, y, and z coordinates of each audio sensor are processed to obtain a set of pose kernels K. Each of the audio recordings in FIG. 6 may be referred to as a data audio recording. Pose kernels (impulses responses) are obtained both with the subject human absent (empty room) and with the subject human present. The pose kernels are processed based on audio sensor (microphone) and speaker positions to obtain spatial encodings K (see FIG. 4 for the relationship between the spatial encodings and the audio sensor and speaker positions, also see equations 5-6 below).

Figure 10A:
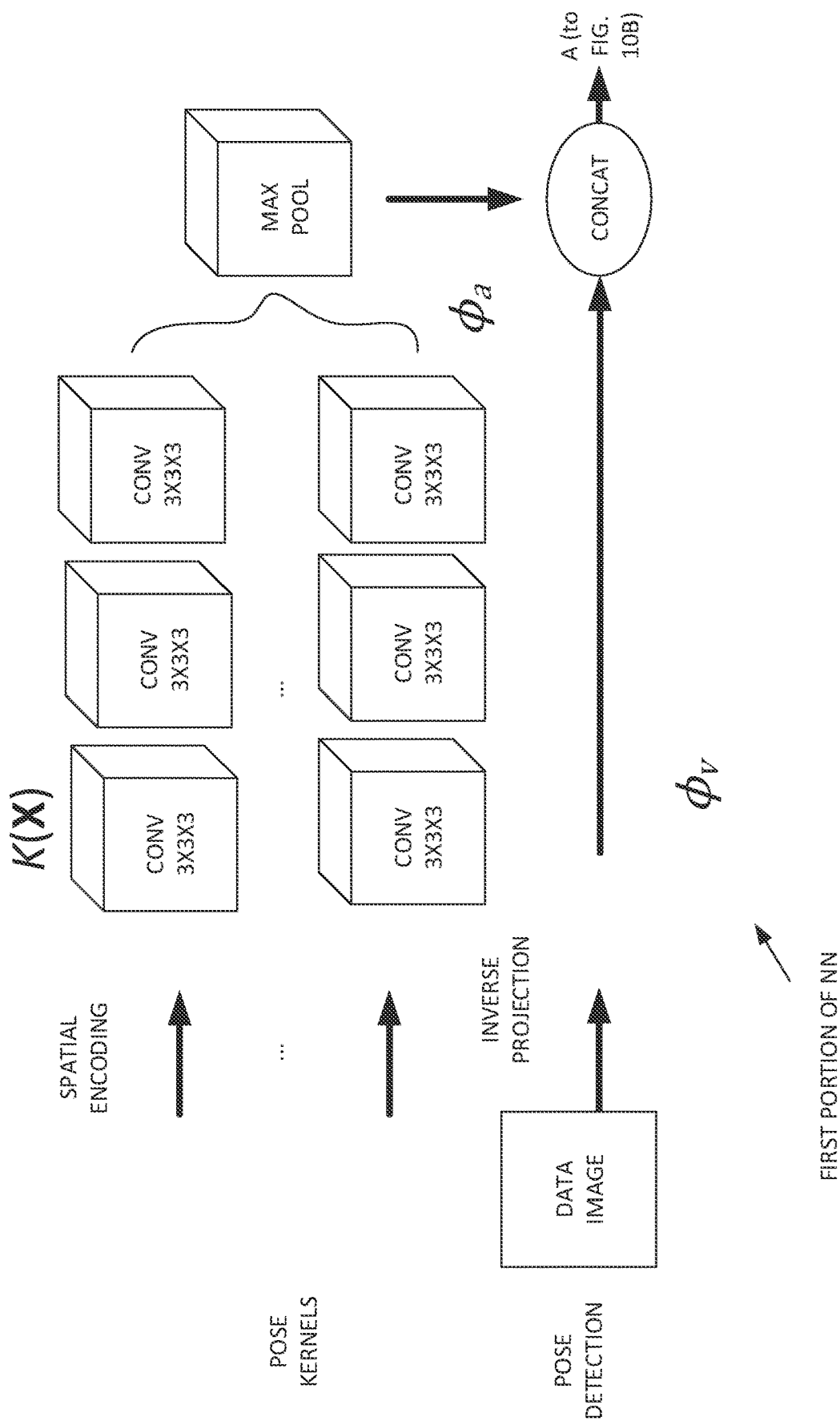
FIG. 10A and 10B illustrate the neural network in block diagram form, according to some embodiments.
Figure 10B:
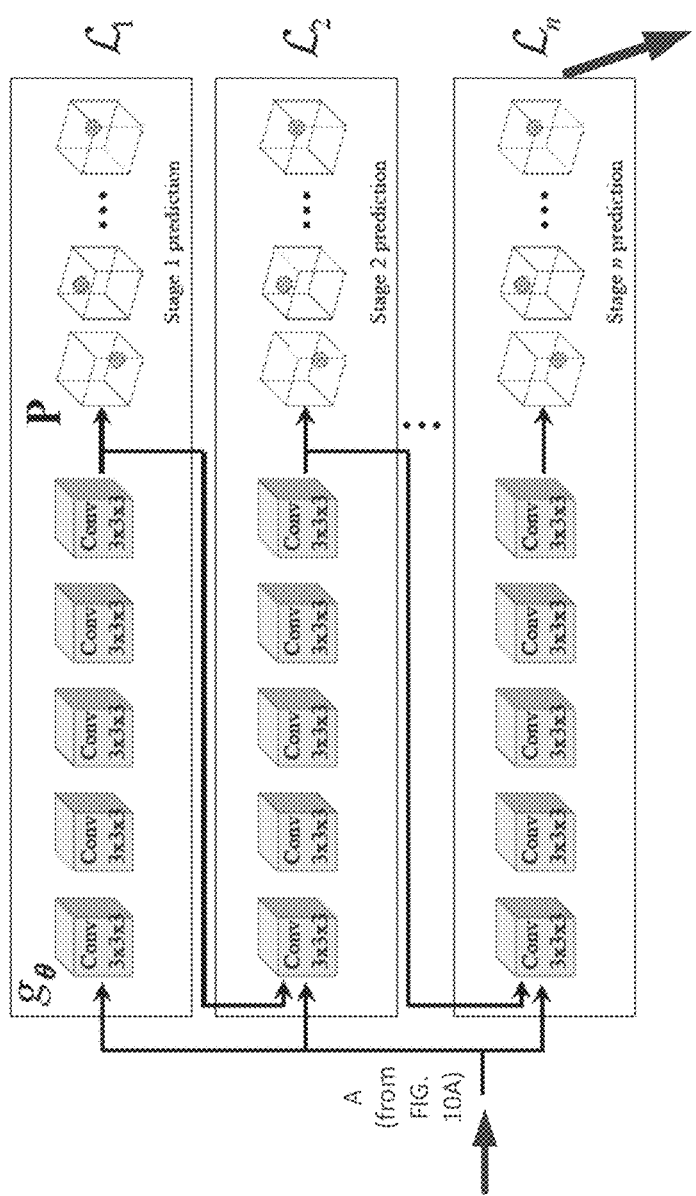
Figure 10B:
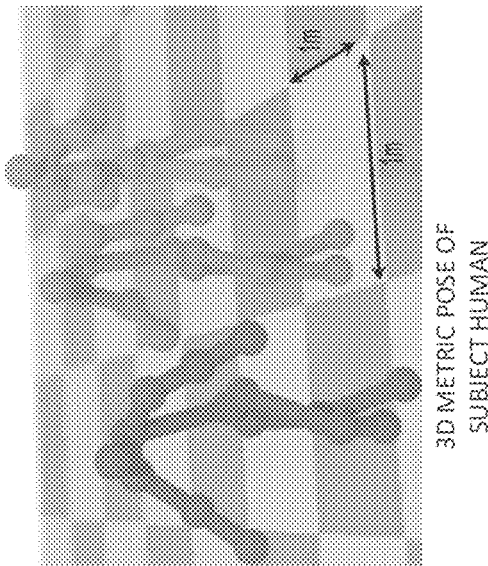

The NN then processes the data image and the spatial encodings to provide the 3D metric pose of the subject human as shown in FIG. 6 (also see FIGS. 10A and 10B and equations 8-10). The 3D metric pose of the subject human provides x, y, and z coordinates of landmarks on the body surface X of the subject human.

Thus FIG. 6 illustrates obtaining a data image of the subject human in a target environment (see camera 1 in FIG. 6 and data image), obtaining a plurality of data audio recordings of the target environment while the subject human is present in the target environment (see FIG. 6 with audio sensor 1, audio sensor 2 and the data audio recordings), determining, by a neural network (NN, see the NN in the lower left of FIG. 6), a 3D metric pose of the subject human (see the x, y, z coordinates and pose representation in the lower left of FIG. 6) based on an input of the data image and the plurality of data audio recordings. As shown in FIG. 5, the NN is trained using a training dataset including training images (see image 2 with depth 2 etc on the left of FIG. 5) and training audio recordings (see audio sensor n+1 and audio sensor n+2 in FIG. 5) captured in a plurality of training environments (see annotation at time of FIG. 5) with respect to a plurality of training humans (see person 2, 3, . . . in FIG. 5).

Figure 7:
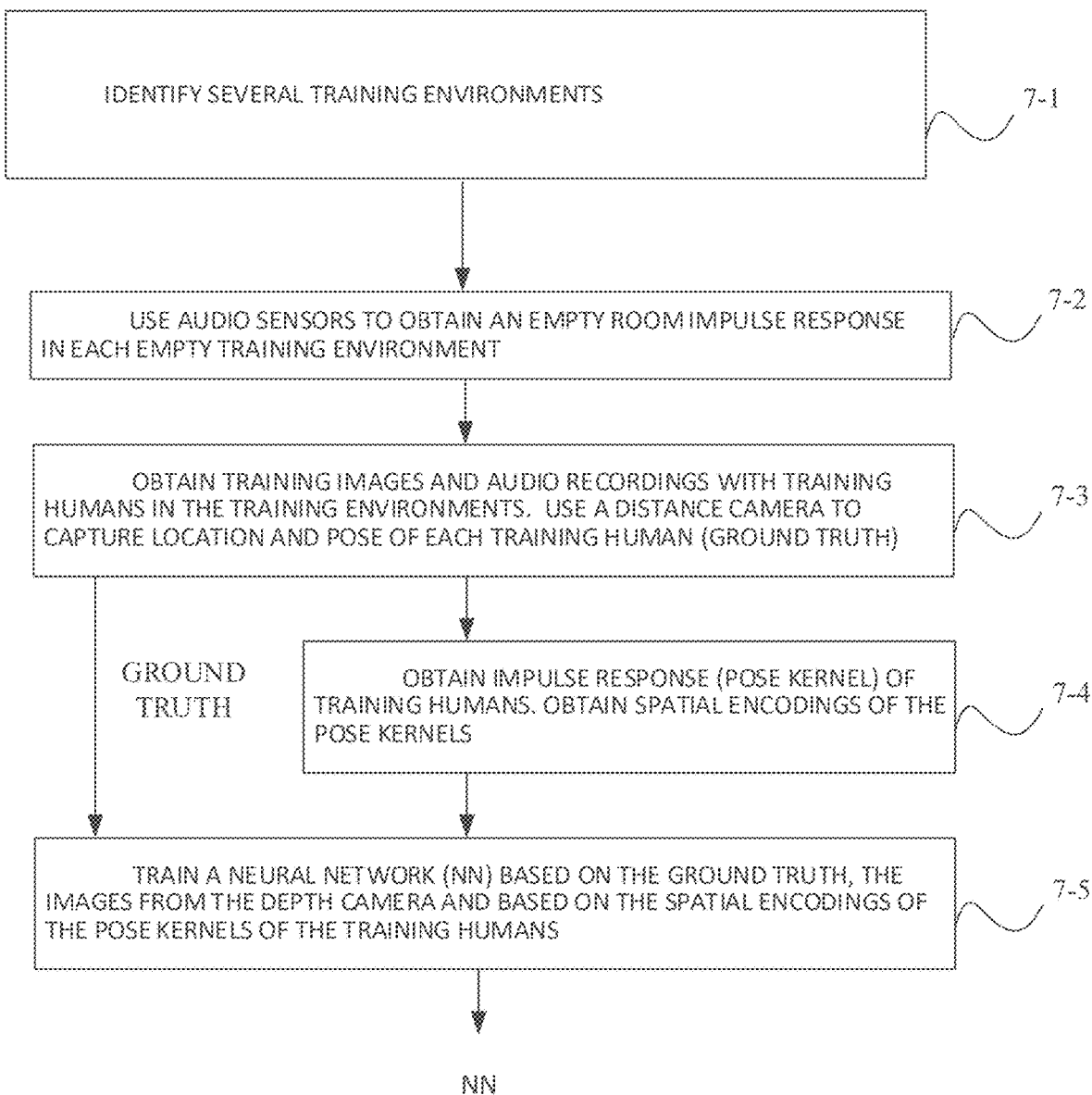
FIG. 7 illustrates logic for training the neural network, according to some embodiments.

FIG. 7 illustrates logic 7-10 for training the NN. At operation 7-1, several training environments are identified. At operation 7-2, audio sensors are used to obtain impulse responses in the training environments with no person present (empty room). This impulse response may be referred to as an empty room impulse response. As discussed above, an recovered impulse response of person is referred to as a pose kernel (see, for example, FIG. 4).

At operation 7-3, training images and training audio recordings are obtained with training humans in the training environments. A distance camera is used to capture depth information providing 3D metric pose for each training human in each training environment. The 3D metric pose obtained for each training human represents ground truth information.

At operation 7-4, from the training audio recordings and knowledge of the locations of the speakers and audio sensors, impulse responses are obtained. An empty room impulse response is obtained, an occupied room impulse response is obtained, and a deconvolution is performed to obtain an impulse response of the training human (pose kernel) from the occupied room impulse response. A spatial encoding of the pose kernel is then obtained (see for example FIG. 4).

At operation 7-5, the NN is trained based on the pose kernels, the training images from the depth camera and based on the ground truth information (3D metric poses of the training humans obtained at operation 7-3).

Thus, logic 7-10 identifies a plurality of training environments (operation 7-1), obtains, using a first plurality of audio sensors and corresponding first audio recordings (see FIG. 6), a first plurality of empty room impulse responses in the first training environment while no human is present (see operation 7-2), obtains, using audio sensors and corresponding second audio recordings in the first training environment, a first plurality of occupied room impulse responses in the first training environment while a first training human is present (see operations 7-3 and 7-4 and Eq. 4 below), obtains, using a distance camera, a first training image of the first training human in the first training environment (see operation 7-3 and also see FIG. 5 generally), obtains, using a second plurality of audio sensors and corresponding third audio recordings in the second training environment (see FIG. 5 environments 2, 3, . . . ), a second plurality of empty room impulse responses in the second training environment while no human is present, obtains, using the second plurality of audio sensors and corresponding fourth audio recordings in the second training environment, a second plurality of occupied room impulse responses in the second training environment while a second training human is present (see FIG. 5 person 2, 3, . . . ), obtains, using the distance camera, a second training image of the second training human in the second training environment, wherein the distance camera provides second depth information, and trains the NN based on the first plurality of empty room impulse responses, the first plurality of occupied room impulse responses, the second plurality of empty room impulse responses, the second plurality of occupied room impulse responses, the first training image, the first depth information, the second training image and the second depth information.

An example of steps for obtaining the NN is developed in the equations below and the subsequent discussion.

The problem of 3D pose lifting is the learning of a function $g_\theta$ that predicts a set of 3D heatmaps $\{P_i\}_{i=1}^{N}$ given an input image I of dimension W×H×3 consisting of values 0 or 1 at each pixel where $P_i$ is the likelihood of the $i^{th}$ landmark over a 3D space, W and H are the width and height of the image and N is the number of landmarks. In other words, $$\{P_i\} = g_\theta(I) \quad \text{Eq.1}$$

The weights of g are θ.

The optimal 3D pose is given by $X^*_i = \text{argmax}(P_i(X))$ where the argmax is over X and $X^*_i$ is the optimal location of the $i^{th}$ landmark. A regular voxel grid may be used to represent P.

Eq. 1 is extended by embodiments to use audio signals as in Eq. 2.

$$\{P_i\}_{i=1}^{N} = g_\theta(I, \{k_j(t)\}_{j=1}^{M}) \quad \text{Eq. 2}$$

Where $k_j(t)$ is the pose kernel heard from the $j^{th}$ microphone—a time-invariant audio impulse response with respect to human pose geometry that transforms the transmitted audio signals. M denotes the number of received audio signals. The received signal $r_j(t)$ at the $j^{th}$ microphone is given in Eq. 3 where * is the operation of time convolution, s(t) is the transmitted source signal (also called simply "source"), and $\overline{k}_j(t)$ is the empty room impulse response due to static scene geometry (walls and objects as reflectors) in the absence of a person.

$$r_j(t) = s(t) * (\overline{k}_j(t) + k_1(t)) \quad \text{Eq. 3}$$

The pose kernel can be found using the inverse Fourier transform $F^{-1}(\cdot)$ as shown in Eq. 4.

$$k_j(t) = F^{-1}(K_j(f)), K_j(f) = \frac{R_j(f)}{S(f)} - \overline{K}_j(f) \quad \text{Eq. 4}$$

In Eq. 4, R(f), S(f), and $\overline{K}\_j(f)$ are the frequency responses of r(t), s(t) and $\overline{k}_j(t)$, respectively.

The pose kernel is dominated by direct reflection from the body. Multipath shadow effect depends on room geometry, and for large rooms it is not significant.

The time domain pose kernel of the $j^{th}$ microphone is encoded to a 3D spatial domain based on the geometry of FIG. 4.

A transmitted audio wave at the speaker's location is reflected by the body surface at X (in x, y, z coordinates) and arrives at the audio sensor (microphone) location. The arrival time $t_x$ is given in Eq. 5.

$$t_x = \left(\frac{1}{v}\right)[norm(s_{spk} - X) + norm(s_{mic} - X)] \quad \text{Eq. 5}$$

where norm(·) is the Euclidean distance and v is the speed of sound.

Eq. 6 gives the pose kernel as the superposition of impulse responses from the reflective points on the body surface, χ.

$$k_j(t) = \Sigma A(X)\delta(t-t_x) \quad \text{Eq. 6}$$

In Eq. 6, the sum is over $X \in \chi$ and $\delta(t-t_x)$ is the impulse response and A(X) is the reflection coefficient at X. X is a point in 3D space having coordinates x, y, and z.

Equations 5 and 6 indicate: i) since the locus of points whose sum of distances to the audio sensor and the speaker is an ellipsoid, the same impulse response can be generated by any point on the ellipsoid and ii) the arrival time (the argument of the pose kernel) indicates spatial distance by the spatial encoding $K_j(X)$ as shown in Eq. 7.

$$K_j(X) = k_j(t) \text{ evaluated at } t = t_x \quad \text{Eq. 7}$$

Eq. 2 is reformulated in Eq. 8 based on the spatial encoding of the pose kernel using feature extractors $\phi_v$ and $\phi_a$ for visual and audio signals, respectively.

$$\{P_i\}_{i=1}^{N} = g_\theta([\phi_v(X,I), \{k_j(t)\}_{j=1}^{M}, \max \phi_a(K\_j(X))] \quad \text{Eq. 8}$$

Eq. 9 gives the visual features evaluated at the projected location of X onto the image I.

$$\phi_v(X;I) = \{p_i(\Pi X)\}_{i=1}^{N} \quad \text{Eq. 9}$$

In Eq. 9, $p_i$ is the likelihood of the $i^{th}$ landmark in the image I. Π is the operation of 2D projection, that it is the likelihood of the $i^{th}$ landmark at 2D projection location ΠX. $\phi_a(K_j(X))$ is the audio feature from the $j^{th}$ pose kernel evaluated at X. Embodiments use a max-pooling operation to fuse multiple received audio signals. The max-pooling is agnostic to location and ordering of audio signals. This facilitates scene generalization where the learned audio features can be applied to a new scene with different audio configurations (for example, the number of sources, locations, scene geometry).

The parameters θ and formulation of $\phi_a$ are found by minimizing the loss provided in Eq. 10.

$$L = \Sigma(\text{norm}(g_\theta(\phi_v, \max(\phi_a(K_j)) - \{\hat{P}_i\}_{i=1}^{N})^2 \quad \text{Eq. 10}$$

In Eq. 10, the sum is over I, K, $\hat{P} \in D$, the max is over j, $\{\hat{P}_i\}_{i=1}^{N}$ is the ground truth 3D heat maps and D is the training dataset. An off-the-shelf human pose estimator can be used to find $\{p_i\}_{i=1}^{N}$.

The NN is a 3D convolution neural network (3D CNN) which operates on encoded 2D pose detection from an image and audio signals from audio sensors (microphones). In an example, the network is composed of six stages that can increase the receptive field while avoiding the issue of the vanishing gradients. In an example, the 2D pose detection is represented by a set of heatmaps that are encoded in a 70×70×50 voxel grid via inverse projection, which forms 16 channel 3D heatmaps.

For the pose kernel from each audio sensor, embodiments spatially encode over a 70×70×50 voxel grid that are convolved with three 3D convolutional filters followed by max pooling across four audio channels. In an example, each grid is 5 cm, resulting in 3.5 m×3.5 m×2.5 m space. These audio features are combined with the visual features to form the audio-visual features. These features are transformed by a set of 3D convolutions to predict the 3D heatmaps for each joint. The prediction, in turn, is combined with the audio-visual features to form the next stage prediction. The network architecture is shown in FIGS. 10A and 10B.

The audio signals may be based on a chirp signal of duration 100 ms sweeping frequencies from 19 kHz to 32 kHz.

The cameras, speakers and audio sensors may be spatially calibrated using off-the-shelf structure-from-motion software by scanning the environments with an additional camera and using metric depth from RGB-D cameras to estimate the true scale of the 3D reconstruction. The speakers and audio sensors can be hardware synchronized using a field recorder sampling at 96 kHz.

As an example, the NN can be implemented with PyTorch and trained on a server using, for example, 4 Tesla v100 GPUs. An SGD optimizer can be used with a learning rate of 1. In an example, the NN may be trained for 70 epochs until convergence.

Figure 8:
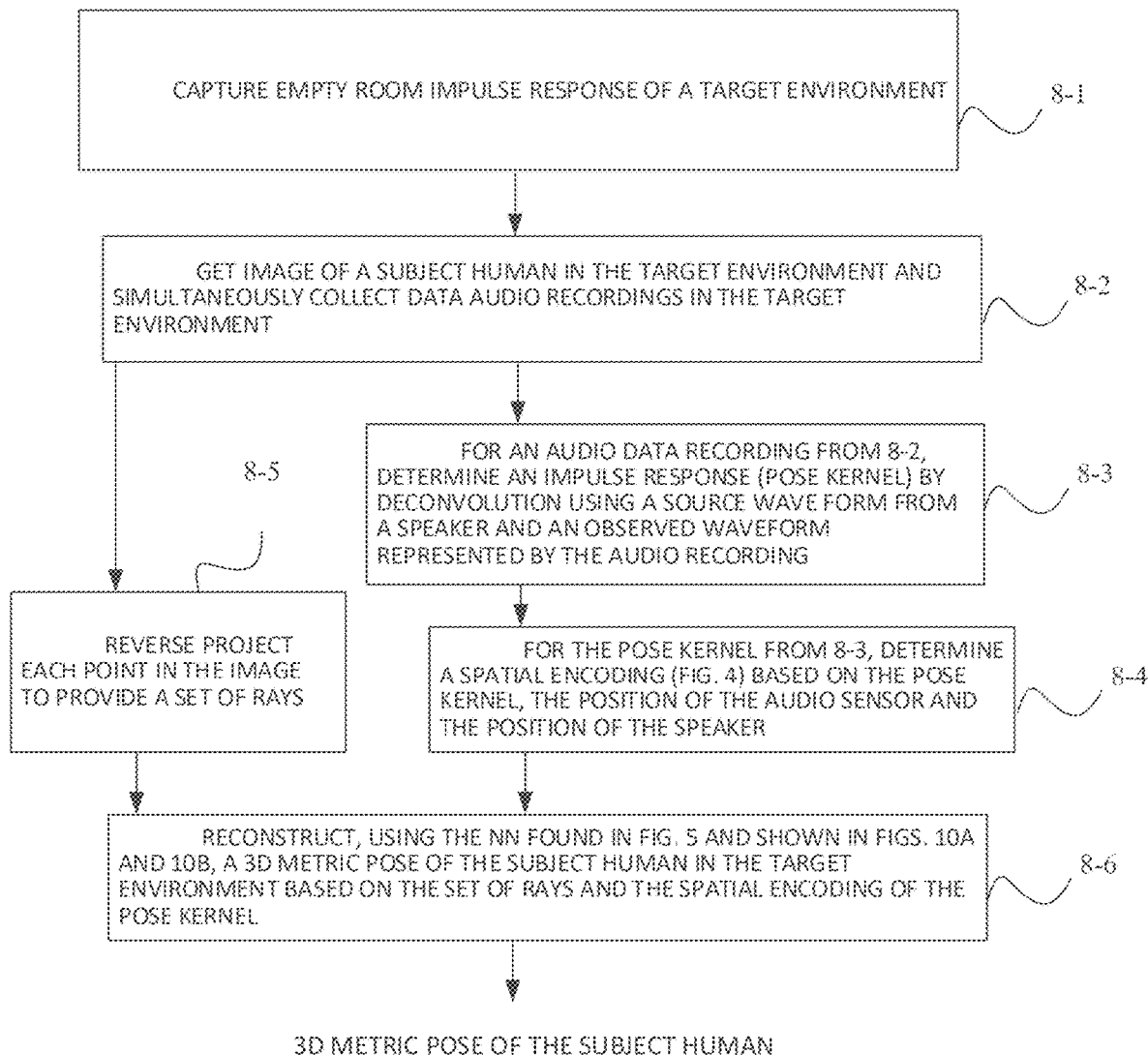
FIG. 8 illustrates logic for obtaining the 3D metric pose of the subject human, according to some embodiments.

FIG. 8 illustrates logic 8-10 for inference using the NN. At operation 8-1, empty room impulse responses of target environments are captured.

At operation 8-2, a data image of a subject human in the target environment is obtained while simultaneously collecting data audio recordings in the target environment.

At operation 8-3, using a data audio recording, an impulse response (pose kernel) of the subject human is obtained. The steps in obtaining a pose kernel, as mentioned above, including obtaining an empty room impulse response, obtaining an occupied room impulse response an deconvolving the empty room impulse response from the occupied room impulse response to obtain the impulse response of the subject human, which is called a pose kernel.

At operation 8-4, a spatial encoding of the pose kernel is obtained.

At operation 8-5, each point from the data image is reverse projected to obtain a set of rays.

At operation 8-6, a 3D metric pose of the subject human is found based on the spatial encoding and the set of rays. In general, there are one or more audio sensors and one or more spatial encodings.

Example applications of the obtained 3D metric pose include a smart home robotic assistant which can hand a cup to the subject human.

Another example is AR/VR/XR in which understanding real-world 3D geometry creates a shared surface between users and machines and gives a user a better spatial feeling for gaming and virtual conferences.

Figure 9A:
FIG. 9A illustrates a juxtaposition of three data images of a subject human in a target environment.

FIG. 9A illustrates three data images. The target environment and the subject human are the same for the three images, so the three images are shown as one image with the different views of the subject human juxtaposed.

Figure 9B:
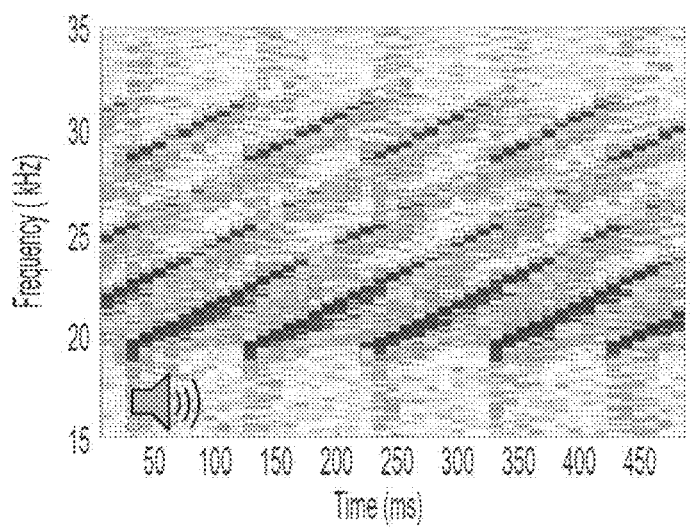
FIG. 9B illustrates a single audio recording for the subject human in the target environment.

FIG. 9B shows an example target audio recording. The y-axis is shown in the frequency domain and the x-axis is the time domain.

Figure 9C:
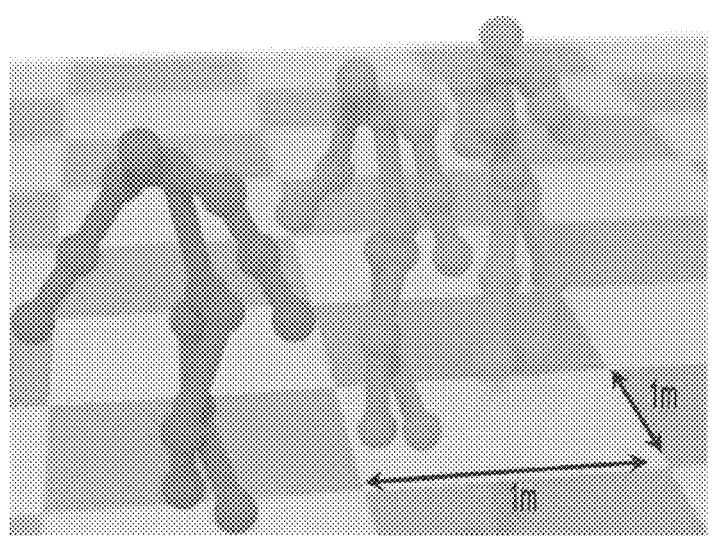
FIG. 9C illustrates three 3D metric poses of the subject human recovered in part based on the data images of FIG. 9A, according to some embodiments.

FIG. 9C illustrates three recovered 3D metric poses of the subject human of FIG. 9A. FIG. 9C is a perspective drawing showing width, depth and height of the recovered 3D metric poses.

FIGS. 10A (a first portion of the NN) and 10B (a second portion of the NN) illustrate the NN. The pose kernels are input in the upper left of FIG. 10A and undergo spatial encoding. The spatial encodings are then input to convolutional layers which produce features $\phi_a$. The features $\phi_a$ go through a max pool operation and then are concatenated with features $\phi_v$ to produce the vector A. Joint detection is performed on the data image to obtain the location of landmarks, also called joints. The collection of landmarks may be referred to as "2D joint locations." The features $\phi_v$ are obtained by inverse projection of the 2D joint locations.

FIG. 10B illustrates that the vector A is simultaneously processed by multi-stages of prediction. The parameters of the NN are indicated as $g_\theta$. The loss of each stage of prediction is indicated as L.

The output of the stage n prediction is the 3D metric pose of the subject human.

Figure 11B:
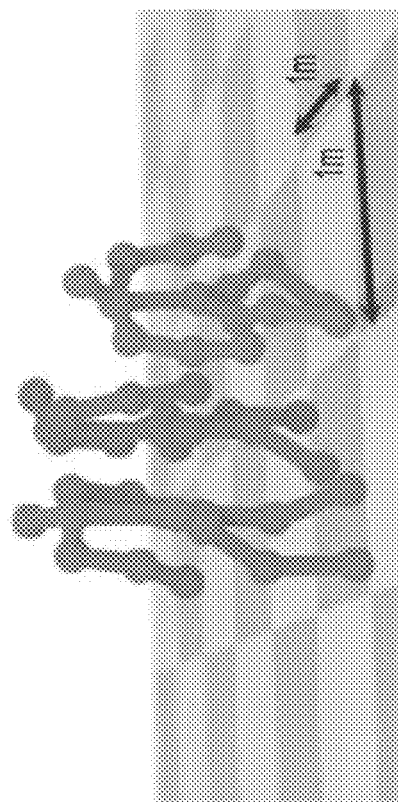
FIG. 11B illustrates three 3D metric poses of the second subject human recovered in part based on the data images of FIG. 11A, according to some embodiments.
Figure 11A:
FIG. 11A illustrates a juxtaposition of three data images of a second subject human in a second target environment.
Figure 12:
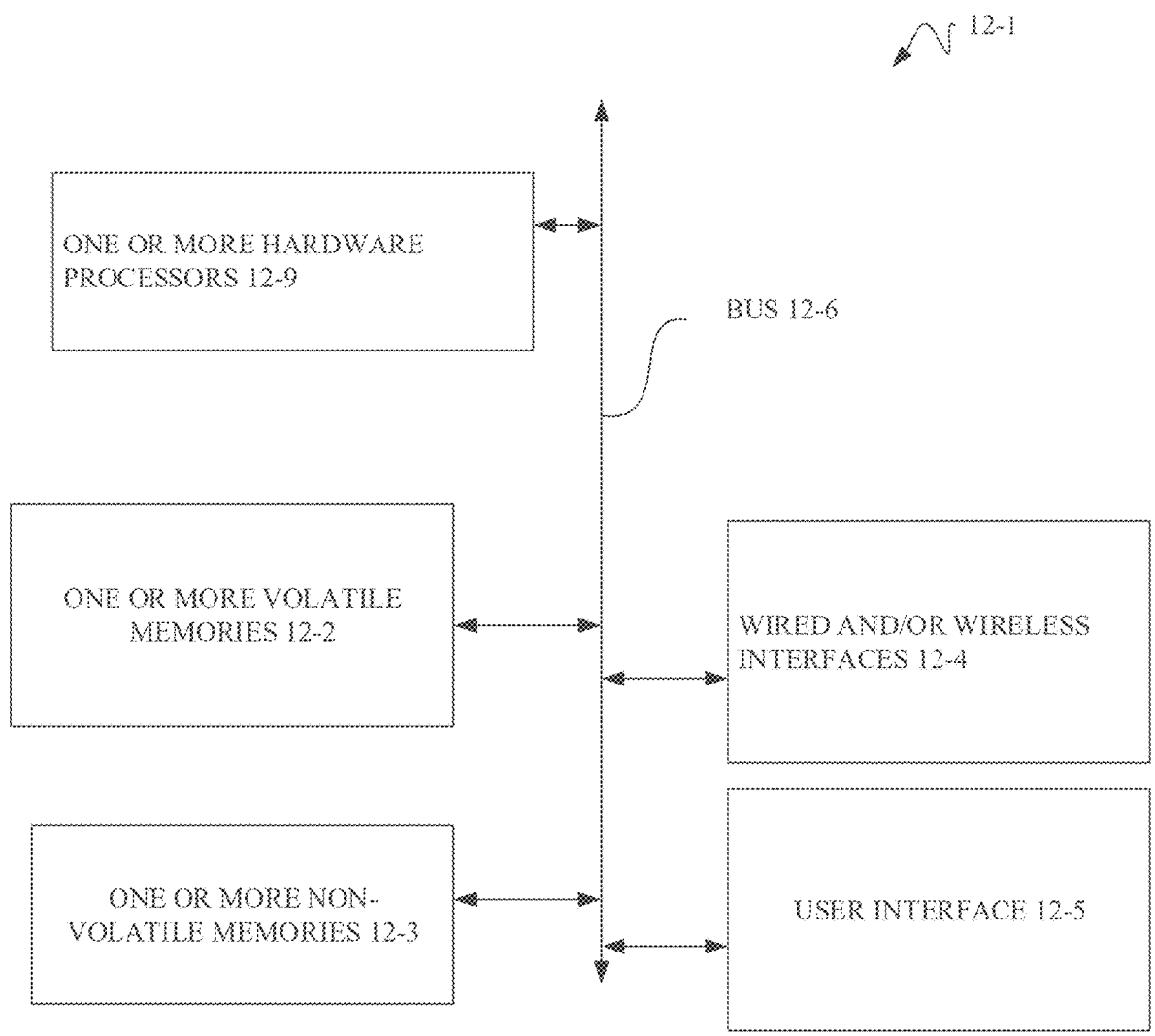
FIG. 12 illustrates exemplary hardware for implementation of computing devices for implementing the systems and algorithms described by the figures, according to some embodiments.

FIG. 11A illustrates three data images of a subject human in a target environment. Similarly to FIG. 9A, three images are juxtaposed.

FIG. 11B illustrates, corresponding to the subject human of FIG. 11A, three 3D metric poses recovered by the NN of FIGS. 10A-10B.

Hardware for performing embodiments provided herein is now described with respect to FIG. 8. FIG. 8 illustrates an exemplary apparatus 8-1 for implementation of the embodiments disclosed herein. The apparatus 8-1 may be a server, a computer, a laptop computer, a handheld device, or a tablet computer device, for example. Apparatus 8-1 may include one or more hardware processors 8-9. The one or more hardware processors 8-9 may include an ASIC (application specific integrated circuit), CPU (for example CISC or RISC device), and/or custom hardware. Apparatus 8-1 also may include a user interface 8-5 (for example a display screen and/or keyboard and/or pointing device such as a mouse). Apparatus 8-1 may include one or more volatile memories 8-2 and one or more non-volatile memories 8-3. The one or more non-volatile memories 8-3 may include a non-transitory computer readable medium storing instructions for execution by the one or more hardware processors 8-9 to cause apparatus 8-1 to perform any of the methods of embodiments disclosed herein.

What is claimed is:

1. A method of estimating a pose of a subject human, the method comprising:

obtaining a data image of the subject human in a target environment;

obtaining a plurality of data audio recordings of the target environment while the subject human is present in the target environment;

determining, by a neural network (NN), a 3D metric pose of the subject human based on an input of the data image and the plurality of data audio recordings, wherein the NN is trained using a training dataset including training images and training audio recordings captured in a plurality of training environments with respect to a plurality of training humans, wherein the plurality of training environments comprises a first training environment and a second training environment, and the training comprises:

obtaining, using a first plurality of audio sensors and corresponding first audio recordings, a first plurality of empty room impulse responses in the first training environment while no human is present;

obtaining, using the first plurality of audio sensors and corresponding second audio recordings in the first training environment, a first plurality of occupied room impulse responses in the first training environment while a first training human is present;

obtaining, using a distance camera, a first training image of the first training human in the first training environment, wherein the distance camera provides first depth information;

obtaining, using a second plurality of audio sensors and corresponding third audio recordings in the second training environment, a second plurality of empty room impulse responses in the second training environment while no human is present;

obtaining, using the second plurality of audio sensors and corresponding fourth audio recordings in the second training environment, a second plurality of occupied room impulse responses in the second training environment while a second training human is present;

obtaining, using the distance camera, a second training image of the second training human in the second training environment, wherein the distance camera provides second depth information; and training the NN based on the first plurality of empty room impulse responses, the first plurality of occupied room impulse responses, the second plurality of empty room impulse responses, the second plurality of occupied room impulse responses, the first training image, the first depth information, the second training image and the second depth information.

2. The method of claim 1, wherein the training further comprises:

obtaining, based on: i) the first plurality of empty room impulse responses, ii) the first plurality of occupied room impulse responses, and iii) a first plurality of audio waveforms which drive a first plurality of speakers, a first pose kernel of the first training human;

obtaining, based on: i) the second plurality of empty room impulses responses, ii) the second plurality of occupied room impulse responses, and iii) a second plurality of audio waveforms which drive a second plurality of speakers, a second pose kernel of the second training human; and training the NN based on the first pose kernel, the second pose kernel, the first training image and the second training image.

3. The method of claim 2, wherein the determining a 3D metric pose of the subject human comprises:
obtaining, using a third plurality of audio sensors and corresponding fifth audio recordings in the target environment and a third plurality of speakers driven by a third plurality of audio waveforms, a third plurality of empty room impulse responses in the target environment while no human is present;
obtaining, using the third plurality of audio sensors and corresponding sixth audio recordings in the target environment and the third plurality of speakers driven by the third plurality of audio waveforms, a third plurality of occupied room impulse responses in the target environment while the subject human is present;
obtaining, using a camera, the data image of the subject human in the target environment, wherein the camera does not provide depth information;
obtaining, based on the third plurality of empty room impulse responses, the third plurality of occupied room impulse responses and the data image, a subject pose kernel of the subject human; and
determining, by the NN based on the subject pose kernel of the subject human, the 3D metric pose of the subject human.

4. The method of claim 3, wherein the NN is configured to predict a set of 3D heatmaps based on the data image, wherein a heatmap comprises a likelihood of a landmark on a surface of the subject human, and the likelihood is represented in a regular voxel grid.

5. The method of claim 4, wherein an optimal 3D pose is found using an argmax(·) function applied to the set of 3D heatmaps.

6. The method of claim 4, wherein each 3D heatmap of the set of 3D heatmaps is found based on the data image and the subject pose kernel, wherein the subject pose kernel is a time-invariant audio impulse response with respect to human pose geometry.

7. The method of claim 6, wherein the subject pose kernel is heard from a first audio sensor of the third plurality of audio sensors.

8. The method of claim 7, wherein the subject pose kernel is found based on a first audio recording of the fifth audio recordings, and the first audio recording is approximated as a convolution of a source signal from a first speaker of a plurality of speakers with a sum of an empty room impulse response and the first pose kernel.

9. The method of claim 8, wherein the first pose kernel is found by dividing a first frequency domain representation of an audio recording by a second frequency domain representation of a source waveform and then removing a third frequency domain representation associated with an empty room.

10. The method of claim 9, wherein the first pose kernel is substantially determined by a direct reflection from the subject human.

11. The method of claim 10, where the first pose kernel is a superposition of impulse responses from reflective points on a body surface of the subject human.

12. The method of claim 11, wherein a first spatial encoding of a plurality of spatial encodings is found based on an ellipsoid, with a locus of points representing the ellipsoid determined by the first pose kernel, a first location of the first speaker and a second location of the first audio sensor.

13. The method of claim 12, wherein the NN receives an input representing a plurality of visual features provided by a landmark detection applied to the data image.

14. The method of claim 12, wherein the NN receives an input representing a plurality of audio features based on the first spatial encoding of the first pose kernel.

15. The method of claim 14, wherein the NN is configured to processing the plurality of visual features and the plurality of audio features using a plurality of stages, wherein the plurality of stages reduces a vanishing gradient problem in a training of the NN.

16. The method of claim 15, wherein the 3D metric human pose is an output of a final stage of the NN.

17. A system for estimating a pose of a subject human, the system comprising:
a plurality of audio sensors configured to provide a first plurality of audio recordings in a plurality of training environments with no human present and a second plurality of audio recordings in the plurality of training environments when a training human is present;
a camera configured to provide a data image of the subject human in a subject environment, wherein the data image does not include depth information;
a second plurality of audio sensors configured to:
obtain a third plurality of audio recordings in the subject environment when the subject human is present;
a first processor configured to:
lift a plurality of training pose kernels from the first plurality of audio recordings and the second plurality of audio recordings, and
train a neural network (NN) based on the plurality of training pose kernels and depth information of the training human in the plurality of training environments; and
a second processor configured to:
implement the NN to lift a 3D metric pose of the subject human based on the data image, the second plurality of audio recordings and the third plurality of audio recordings.

18. The system of claim 17, further comprising a distance camera configured to provide the depth information of the training human in a first training environment of the plurality of training environments.

19. A non-transitory computer readable medium for storing a program to be implemented by a processor to estimate a pose of a subject human by:
obtaining a data image of the subject human in a target environment;
obtaining a plurality of data audio recordings of the target environment while the subject human is present in the target environment; and
determining, using a neural network (NN) a 3D metric pose of the subject human based on an input of the data image and the plurality of data audio recordings,
wherein the NN is trained using a training dataset including training images and training audio recordings captured in a plurality of training environments with respect to a plurality of training humans,
wherein the plurality of training environments comprises a first training environment and a second training environment, and the training comprises:

obtaining, using a first plurality of audio sensors and corresponding first audio recordings, a first plurality of empty room impulse responses in the first training environment while no human is present;

obtaining, using the first plurality of audio sensors and corresponding second audio recordings in the first training environment, a first plurality of occupied room impulse responses in the first training environment while a first training human is present;

obtaining, using a distance camera, a first training image of the first training human in the first training environment, wherein the distance camera provides first depth information;

obtaining, using a second plurality of audio sensors and corresponding third audio recordings in the second training environment, a second plurality of empty room impulse responses in the second training environment while no human is present;

obtaining, using the second plurality of audio sensors and corresponding fourth audio recordings in the second training environment, a second plurality of occupied room impulse responses in the second training environment while a second training human is present;

obtaining, using the distance camera, a second training image of the second training human in the second training environment, wherein the distance camera provides second depth information; and training the NN based on the first plurality of empty room impulse responses, the first plurality of occupied room impulse responses, the second plurality of empty room impulse responses, the second plurality of occupied room impulse responses, the first training image, the first depth information, the second training image and the second depth information.

* * * * *